United States Patent Office 3,369,022
Patented Feb. 13, 1968

3,369,022
3-PIPERAZINOALKYL-2-BENZOXAZOLINONES
Joseph Sam, Oxford, Miss., and Charles W. Richmond, Nashville, Tenn., assignors to A. H. Robins Company, Incorporated, Richmond, Va., a corporation of Virginia
No Drawing. Filed Nov. 7, 1966, Ser. No. 592,253
10 Claims. (Cl. 260—268)

ABSTRACT OF THE DISCLOSURE 3-piperazinoalkyl-2-benzoxazolinones. Compounds are useful as central nervous system depressants, having sedative, hypnotic, analgesic, and anesthetic, as well as anticonvulsant and antihistaminic properties.

The present invention relates to certain novel heterocyclic organic compounds which may be referred to as substituted 2-benzoxazolinones, and is more particularly concerned with 3-piperazinoalkyl-2-benzoxazolinones and methods of making the same.

The invention is particularly concerned with novel compounds having the formula:

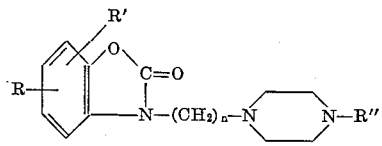

I wherein n is 2 or 3,
wherein R is selected from the group consisting of hydrogen, halogen, trifluoromethyl, lower-alkyl, and lower-alkoxy,
wherein R' is selected from the group consisting of hydrogen and halogen, and
wherein R'' is selected from the group consisting of phenyl, halophenyl, lower-alkylphenyl, lower-alkoxyphenyl, trifluoromethylphenyl, hydroxy-lower-alkyl, lower-alkoxy-lower-alkyl, and acid addition salts thereof.

The compounds of the invention having the foregoing Formula I are generally characterized by important pharmacological activity and are useful as central nervous system depressants, exhibiting sedative, hypnotic, analgesic, and anesthetic, as well as anticonvulsant and antihistaminic properties.

The activity of the active agents of the present invention has been evidenced by tests in lower animals. It will be clearly understood that the distribution and marketing of any compound or composition falling within the scope of the present invention for use in human beings will of course have to be predicated upon prior approval by governmental agencies, such as the U.S. Federal Food and Drug Administration, which are responsible for and authorized to pass judgment on such questions.

It is accordingly an object of the present invention to provide new and useful 3-piperazinoalkyl-2-benzoxazolinones and methods of making the same. Other objects of the invention will be apparent to one skilled in the art, and still other objects will become apparent hereinafter.

In the definition of symbols in the foregoing Formula I and where they appear elsewhere throughout this specification, the terms have the following significance.

The term "lower-alkyl" as used herein includes straight and branched chain radicals of up to eight carbon atoms inclusive and is exemplified by such groups as methyl, ethyl, propyl, isopropyl, butyl, sec. butyl, tertiary butyl, amyl, isoamyl, hexyl, heptyl, octyl, and the like. "Lower alkoxy" has the formula —O—lower-alkyl.

The compounds of Formula I may be converted to and are most conveniently employed in the form of non-toxic pharmaceutically acceptable acid addition salts. Such salts also have improved water-solubility. Although the non-toxic salts are preferred, any salt may be prepared for use as a chemical intermediate, as in the preparation of another but non-toxic acid addition salt. The free basic compounds of Formula I may be conveniently converted to their acid addition salts by reaction of the free base with the selected acid, preferably in the presence of an organic solvent inert to the reactants and reaction products under the conditions of the reaction. The acids which can be used to prepare the preferred non-toxic acid addition salts are those which produce, when combined with the free bases, salts the anions of which are relatively innocuous to the animal organism in therapeutic doses of the salts, so that beneficial physiological properties inherent in the free bases are not vitiated by side-effects ascribable to the anions.

Appropriate acid addition salts are those derived from mineral acids such as hydrochloric acid, hydrobromic acid, hydriodic acid, nitric acid, sulfuric acid, and phosphoric acid; and organic acids such as acetic acid, citric acid, lactic acid, fumaric acid, and tartaric acid. The preferred acid addition salt is the hydrochloride.

The acid addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling, or in other conventional manner.

The 3-piperazinoalkyl-2-benzoxazolinone compounds may be prepared by mixing and reacting together the appropriately nuclear-substituted benzoxazolinone with a haloalkylpiperazine derivative. The general reaction may be illustrated by the following equation, wherein R, R', R'' and n have the values previously assigned and X is halogen:

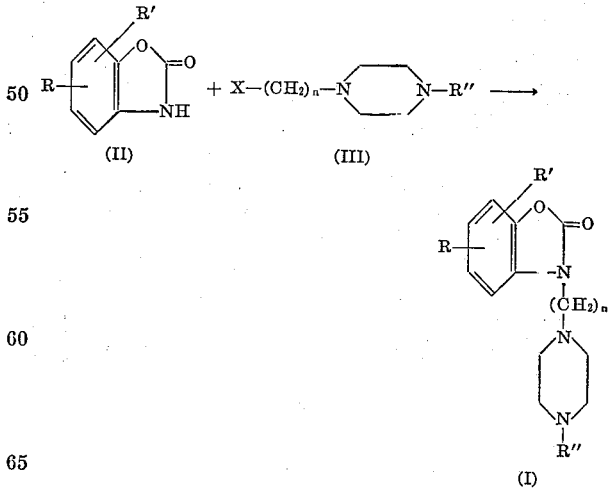

The nuclear-substituted benzoxazolinone starting materials may be obtained by treating a substituted o-aminophenol with urea, or by first reacting a substituted o-nitrophenol with ethyl chloroformate, reducing the nitro group to an amino group, and finally effecting ring formation by elevating the temperature. The products may be isolated either as free bases or as acid addition salts. Alternative methods may be used, as will be described hereinafter.

The starting materials utilized in the preparation of the compounds of the present invention have the following formula:

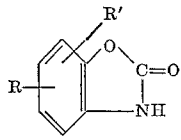

wherein R is selected from the group consisting of hydrogen, halogen, trifluoromethyl, lower-alkyl, and lower-alkoxy. When R is hydrogen, chlorine, fluorine, lower-alkyl, or lower-alkoxy, and R' is halogen or hydrogen, the appropriate 2-benzoxazolinones may be prepared from corresponding substituted-2-aminophenol either by fusion with urea, as disclosed by W. G. Bywater, W. R. Coleman, O. Kamm, and H. H. Merritt, J. Am. Chem. Soc. 67, 905 (1945), or by reaction with phosgene as disclosed by W. J. Close, B. D. Tiffany, and M. A. Spielman, J. Am. Chem. Soc. 71, 1265 (1949).

Although the bromo- and iodo-2-benzoxazolinones can be prepared by the methods described above, the Sandmeyer reaction using 5-amino-2-benzoxazolinone, Z. Eckstein and E. Zukowski, Przemysl. Chem. 37, 418 (1958); Chem. Abstr. 53, 5246 (1959), is preferred.

The following preparations are given by way of illustration only and are not to be construed as limiting.

PREPARATION 1: 5-FLUORO-2-BENZOXAZOLINONE 2-amino-4-fluorophenol in the amount of 0.1 mole and 7.2 g. (0.12 mole) of urea were mixed together and fused at 145–150° C. for 4 hours in a preheated oil bath. The residue was recrystallized from a suitable solvent (water) to give 5-fluoro-2-benzoxazolinone; M.P. 174–175° C.

*Analysis.*—Calcd. for $C_7H_4FNO_2$: C, 54.9; H, 2.61. Found: C, 55.1; H, 2.94.

PREPARATION 2: 5-CHLORO-2-BENZOXAZOLINONE

A suspension of 0.1 mole of 4-chloro-2-aminophenol and 16.4 g. (0.2 mole) of sodium acetate in 300 ml. of ethyl acetate was stirred and treated dropwise with a solution of 10.9 g. (0.11 mole) of phosgene in 200 ml. of ethyl acetate. After refluxing 15 minutes the solution was cooled, washed with water and 5 percent hydrochloric acid, and subsequently distilled in vacuo (water aspirator). The residue was recrystallized from a suitable solvent (water) to give 5-chloro-2-benzoxazolinone.

PREPARATION 3: 5-METHYL-2-BENZOXAZOLINONE

Using the method of Example 1, 4-methyl-2-aminophenol was mixed together and reacted with urea to give 5-methyl-2-benzoxazolinone.

PREPARATION 4: 5-METHOXY-2-BENZOXAZOLINONE

Using the method of Example 1, 4-methoxy-2-aminophenol was mixed and reacted together with urea to give 5-methoxy-2-benzoxazolinone.

PREPARATION 5: 5-BROMO-2-BENZOXAZOLINONE

Using a modification of the procedure described by A. I. Vogel, "Practical Organic Chemistry," John Wiley and Sons, Inc., New York, N.Y., 1948, p. 579, a solution of 5.55 g. of sodium nitrite in 20 ml. of water was added with shaking to a suspension of 11.0 g. (0.073 mole) of 5-amino-2-benzoxazolinone in 40 ml. of 48% hydrobromic acid at 0–5° C. This diazonium salt solution was added dropwise to a boiling solution of 6.5 g. of cuprous bromide in 10 ml. of 48% hydrobromic acid. After complete addition of the diazonium salt, the reaction mixture was refluxed for 15 min., cooled, and the product precipitated by the addition of 300 ml. of cold water. The solid was removed by filtration and recrystallized from ethanol-water to give 12.8 g. (60%) of product, M.P. 218–220° C.

PREPARATION 6: 5-IODO-2-BENZOXAZOLINONE

Using the modification of the procedure described by A. I. Vogel, ibid., p. 575, a solution of 5.0 g. of sodium nitrite in 15 ml. of water was added with shaking to a suspension of 9.2 g. (0.066 mole) of 5-amino-2-benzoxazolinone in 20 ml. of concentrated hydrochloric acid and 20 ml. of water at 0–5° C. To this diazonium salt solution was added slowly a solution of 12.0 g. of potassium iodide in 12 ml. of water. The resulting solution was allowed to stand for one hour, thereafter cautiously heated until the evolution of nitrogen was complete (30 min.), and then cooled. The product was precipitated by the addition of 300 ml. of cold water. The solid was removed by filtration and recrystallized from ethanol-water to give 5.5 g. (34%) of product, M.P. 241–243° C.

PREPARATION 7: 6-CHLORO-5-FLUORO-2-BENZOXAZOLINONE

Using the procedure described by L. Katz and M. S. Cohen, J. Org. Chem. 19, 767 (1954), 9.0 g. (0.058 mole) of 5-fluoro-2-benzoxazolinone and 15 g. (0.072 mole) of phosphorous pentachloride were mixed together and the mixture heated on a steam bath for 12 hours and then treated with 200 ml. of water. The solid which precipitated was removed by filtration and recrystallized from water to give 5.4 g. (48%) of product, M.P. 207–209° C.

PREPARATION 8: 5-TRIFLUOROMETHYL-2-BENZOXAZOLINONE 2-nitro-4-trifluoromethylphenol was first prepared from 3-nitro-4-amino-benzotrifluoride through formation of the diazonium salt and conversion to 2-nitro-4-trifluoromethylphenol via the Sandmeyer reaction. The product was then catalytically reduced to the corresponding amino compound, followed by reaction with phosgene to produce 5-trifluoromethyl-2-benzoxazolinone as a crystalline solid having a melting point of 169–170° C.

PREPARATION 9: 5,6-DICHLORO-2-BENZOXAZOLINONE

To a solution of 158 g. (3.9 moles) of sodium hydroxide and 32 g. (0.3 mole) of sodium carbonate in 1000 ml. of water was added 204 g. (0.83 mole) of 5-chloro-2-benzoxazolinone. An additional 1160 ml. of water was added and the solution was stirred and warmed gently to 80° C., then cooled to 20° C. slowly to precipitate the sodium salt. Chlorine 125 g. (1.75 moles) in 500 ml. of water was added dropwise to the solution at 20–25° C. over a period of 1 hour. Mechanical stirring was continued and the solution slowly heated to 85° C. and maintained at that temperature for 1 hour. Upon cooling the product precipitated and was recrystallized from ethanol to give 190 g. (93%) of product, M.P. 198–200° C. (lit. M.P. 196–197° C.).

PREPARATION 10: 5-CHLORO-6-BROMO-2-BENZOXAZOLINONE 5-chloro-2-benzoxazolinone (236.4 g., 1.4 moles) was dissolved in 2 liters of dry chloroform. The mixture was then cooled to 5° C. and 255.7 g. (1.6 moles) of bromine in 500 ml. of dry chloroform was added dropwise over a period of 2 hours. The temperature was maintained at 10–15° C. during the addition and stirring was continued for an additional 2 hours. The solid product was removed by filtration and recrystallized from methanol-water to give 225.5 g. (95%) of product, M.P. 208–210° C. (lit. M.P. 204–205° C.).

PREPARATION 11: 3-(3-CHLOROPROPYL)-2-BENZOXAZOLINONE

To 200 ml. of Cellosolve (ethylene glycolmonoethyl ether) was added 2.8 g. (0.05 mole) of potassium hydroxide and 6.75 g. (0.05 mole) of 2-benzoxazolinone. This mixture was stirred at room temperature for 1 hour. The solution was then heated to reflux temperature and 62.8 g. (0.4 mole) of 1-bromo-3-chloropropane was added in one portion. The mixture was stirred and refluxed for an additional 2 hours. The solution was filtered while still hot and filtrate was concentrated in vacuo on a steam bath. The resultant dark oil was vacuum distilled, B.P. 165–166° C./0.3 mm. The resultant clear oil crystallized upon standing overnight and was recrystallized from methanol giving 6.0 g. (89%) of product, M.P. 64.5–65.0° C.

*Analysis.*—Calcd. for $C_{10}H_{10}ClNO_2$: C, 56.74; H, 4.76; Cl, 16.75; N, 6.66. Found: C, 56.62; H, 4.67; Cl, 16.62; N, 6.41.

PREPARATION 12: 3-(3-CHLOROPROPYL)-5-CHLORO-6-BROMO-2-BENZOXAZOLINONE

To 200 ml. of Cellosolve was added 2.8 g. (0.05 mole) of potassium hydroxide and 12.5 g. (0.05 mole) of 5-chloro-6-bromo-2-benzoxazolinone. This mixture was stirred at room temperature for 1 hour. The solution was then heated to reflux temperature and 62.8 g. (0.4 mole) of 1-bromo-3-chloropropane was added in one portion. The solution was stirred and refluxed for an additional 2 hours. The solution was filtered while still hot and the filtrate concentrated in vacuo on a steam bath. The resultant dark oil crystallized upon standing. The solid was recrystallized from benzene to give 11.4 g. (91%) of product, M.P. 130–131° C.

*Analysis.*—Calcd. for $C_{10}H_8BrCl_2NO_2$: C, 36.95; H, 2.46; Br, 24.59; Cl, 21.82; N, 4.31. Found: C, 37.15; H, 2.60; Br, 24.55; Cl, 21.73; N, 4.13.

PREPARATION 13: 3-(3-CHLOROPROPYL)-5,6-DICHLORO-2-BENZOXAZOLINONE

A mixture of 10.3 g. (0.05 mole) of 5,6-dichloro-2-benzoxazolinone and 2.8 g. (0.05 mole) of potassium hydroxide in 200 ml. of Cellosolve was stirred at room temperature for 1 hour. In one portion, 62.8 g. (0.4 mole) of 1-bromo-3-chloropropane was added and the entire mixture stirred and refluxed for 4 hours. The precipitate was filtered and the filtrate evaporated in vacuo on a steam bath. The resultant crystals were recrystallized from ethanol to give 7.5 g. (73%) of product, M.P. 135–136° C.

*Analysis.*—Calcd. for $C_{10}H_8Cl_3NO_2$: C, 42.65; H, 2.86; Cl, 37.78; N, 4.97. Found: C, 42.45; H, 2.96; Cl, 37.56; N, 5.08.

As illustrated in the equation set forth in the foregoing, the compounds (I) of the present invention are prepared in one method by reacting a substituted 2-benzoxazolinone (II) with a substituted piperazinoalkyl halide (III). As a general procedure, an appropriately nuclear-substituted 2-benzoxazolinone is dissolved in a suitable solvent such as a monoethyl ether of ethylene glycol containing potassium hydroxide. The starting substituted piperazinoalkyl halide is added slowly with stirring while maintaining the reaction mixture at a suitable temperature such as 20–30° C. The reaction mixture is then refluxed for approximately two hours, cooled, filtered and the solvent removed under reduced pressure. The residue is taken up in a solvent such as benzene and washed with dilute aqueous sodium hydroxide and water. The benzene is removed and the free base purified in an appropriate manner. If the hydrochloride salt is desired, the free base may be dissolved in anhydrous ether. Dry hydrogen chloride is bubbled into the ethereal solution and the hydrochloride salt precipitated. Other acid addition salts are prepared in similar conventional manner. The product is isolated and recrystallized from an appropriate solvent. Other salts may be prepared by allowing the free base to react with acids such as fumaric, maleic, citric, and like acids.

In an alternative method, as illustrated in Examples 13–15, 3-chloroalkyl-2-benzoxazolinones are mixed and reacted together with an N-substituted piperazine to give the compounds of the invention.

The following examples are given by way of illustration only and are not to be construed as limiting.

*Example 1.*—3-[3-(4-methylpiperazino)propyl]-2-benzoxazolinone dihydrochloride monohydrate (1079)

2-benzoxazolinone (0.04 mole) was dissolved in Cellosolve (75 ml.) containing potassium hydroxide (0.08 mole). While maintaining the temperature of 20–30° C., 1-methyl-4-(3-bromopropyl)piperazine (0.04 mole) was added in small increments. The reaction mixture was refluxed for two hours, cooled, filtered, and the Cellosolve removed by distillation under reduced pressure. The residue was taken up in benzene and washed several times with sodium hydroxide (5% aqueous solution) and water. The benzene was removed by distillation under reduced pressure and the residue was dissolved in anhydrous ether. Dry hydrogen chloride was bubbled into the ethereal solution and the hydrochloride salt precipitated. The dihydrochloride salt was removed by suction filtration and recrystallized from ethanol; M.P. 230° C.

*Analysis.*—Calcd. for $C_{15}H_{25}Cl_2N_3O_2$: C, 49.19; H, 6.88; N, 11.41. Found: C, 49.26; H, 7.05; N, 11.47.

*Example 2.*—3-[3-(4-methylpiperazino)propyl]-5-fluoro-2-benzoxazolinone dihydrochloride (910)

Using the method of Example 1, 5-fluoro-2-benzoxazolinone and 1-methyl-4-(3-bromopropyl)-piperazine were mixed and reacted together. After isolation of the product, recrystallization from diethylformamide yielded 3-[3-(4-methylpiperazino)propyl]-5-fluoro-2-benzoxazolinone dihydrochloride which decomposed at 250° C.

*Analysis.*—Calcd. for $C_{15}H_{22}Cl_2FN_3O_2$: C, 49.18; H, 6.06; N, 11.47. Found: C, 48.80; H, 6.05; N, 11.41.

*Example 3.*—5-chloro-3-[3-(4-methylpiperazino)propyl]-2-benoxazolinone dihydrochloride (911)

Using the method of Example 1, 5-chloro-2-benzoxazolinone and 1-methyl-4-(3-bromopropyl)-piperazine were mixed and reacted together. The product, 5-chloro-3-[3-(4-methylpiperazino)propyl]-2-benzoxazolinone dihydrochloride, after isolation was recrystallized from dimethylformamide and decomposed at 240° C.

*Analysis.*—Calcd. for $C_{15}H_{22}Cl_3N_3O_2$: C, 47.06; H, 5.79; N, 10.98. Found: C, 47.12, H, 6.13; N, 11.10.

*Example 4.*—3-{3-[4-(2-hydroxyethyl)piperazino]propyl}-2-benzoxazolinone (1173)

Using the method of Example 1, 2-benzoxazolinone was mixed and reacted with 1-(2-hydroxyethyl)-4-(3-bromopropyl)piperazine. The product, in benzene, after washing alternately with dilute aqueous sodium hydroxide and ice water, was recrystallized from water. This product, 3-{3-[4-(2-hydroxyethyl)piperazino]propyl}-2-benzoxazolinone, had a melting point of 127° C.

*Analysis.*—Calcd. for $C_{16}H_{23}N_3O_3$: C, 62.93; H, 7.59; N, 13.76. Found: C, 63.03; H, 7.65; N, 13.76.

*Example 5.*—3-{3-[4-(2-hydroxyethyl)piperazino]propyl}-5-fluoro-2-benzoxazolinone (1055)

Using the method of Example 1, 5-fluoro-2-benzoxazolinone was mixed and reacted together with 1-(2-hydroxyethyl)-4-(3-bromopropyl)piperazine. The product was washed alternately with dilute aqueous sodium hydroxide and water and, when recrystallized from water, exhibited a melting point range of 104–105° C.

Analysis.—Calcd. for $C_{16}H_{22}FN_3O_3$: C, 59.43; H, 6.86; N, 12.99. Found: C, 58.88; H, 6.96; N, 12.89.

*Example 6.—5-chloro-3-{3-[4-(2-hydroxyethyl)piperazino]propyl}-2-benzoxazolinone (1149)*

Using the method of Example 1, 5-chloro-2-benzoxazolinone and 1-(2-hydroxyethyl)-4-(bromopropyl)piperazine were mixed and reacted together. After washing the reaction product alternately with dilute aqueous sodium hydroxide and water, the product was recrystallized from a mixture composed of water and ethanol. The purified product exhibited a melting point range of 140–141° C.

Analysis.—Calcd. for $C_{16}H_{22}ClN_3O_3$: C, 56.55; H, 6.53; N, 12.37. Found: C, 56.26; H, 6.61; N, 12.90.

*Example 7.—3-[3-(4-phenylpiperazino) propyl]-2-benzoxazolinone*

Using the method of Example 1, 2-benzoxazolinone was mixed and reacted with 1-phenyl-4-(3-bromopropyl)piperazine to yield 3 - [3 - (4-phenylpiperazino)propyl]-2-benzoxazolinone.

*Example 8.—3-{2-[4-(2-methoxyethyl)piperazino]ethyl}-5-bromo-2-benzoxazolinone*

Using the method of Example 1, 5-bromo-2-benzoxazolinone and 1-(2-methoxyethyl) - 4 - (2-bromoethyl)piperazine are mixed and reacted together to give 3-{2-[4-(2-methoxyethyl)piperazino]ethyl} - 5 - bromo-2-benzoxazolinone.

*Example 9.—3-{3-[4-(4-chlorophenyl)piperazino]propyl}-5-iodo-2-benzoxazolinone*

Using the method of Example 1, 5-iodo-2-benzoxazolinone and 1-(4-chlorophenyl)-4-(3-bromopropyl)piperazine are mixed and reacted together to give 3-{3-[4-(4-chlorophenyl)piperazino]propyl}-5-iodo - 2 - benzoxazolinone.

*Example 10.—3-{3-[4-(4-methylphenyl)piperazino]propyl}-5-trifluoromethyl-2-benzoxazolinone*

Using the method of Example 1, 5-trifluoromethyl-2-benzoxazolinone and 1-(4-methylphenyl) - 4 - (3-bromopropyl)piperazine are mixed and reacted together to give 3 - {3 - [4 - (4 - methylphenyl)piperazino]propyl}-5-trifluoromethyl-2-benzoxazolinone.

*Example 11.—3-{3-[4-(2-methoxyphenyl)piperazino]propyl}-5-ethyl-2-benzoxazolinone*

Using the method of Example 1, 5-ethyl-2-benzoxazolinone and 1-(2-methoxyphenyl) - 4 - (3-bromopropyl)piperazine are mixed and reacted together to give 3-{3-[4-(2-methoxyphenyl)piperazino]propyl} - 5 - ethyl-2-benzoxazolinone.

*Example 12.—3-{3-[4-(4-trifluoromethylphenyl)piperazino]propyl}-5-methoxy-2-benzoxazolinone*

Using the method of Example 1, 5-methoxy-2-benzoxazolinone and 1 - (4 - trifluoromethylphenyl) - 4 - (3-bromopropyl)piperazine are mixed and reacted together to give 3-{3-[4-(4-trifluoromethylphenyl)piperazino]propyl}-5-methoxy-2-benzoxazolinone.

The following examples illustrate the preparation of the compounds of the present invention by an alternative process.

*Example 13.—3-[3-(4-methylpiperazin-1-yl)propyl]-5,6-dichloro-2-benzoxazolinone*

In 200 ml. of anhydrous benzene was placed 14.0 g. (0.05 mole) of 3-(3-chloropropyl)-5,6-dichloro-2-benzoxazolinone. The mixture was placed in a nitrogen atmosphere, then stirred and refluxed until a solution was obtained. In one portion 10.0 g. (0.10 mole) of N-methylpiperazine was added and the entire mixture stirred and refluxed for six hours. The solvent was removed in vacuo on a steam bath. The dark liquid was shaken with 300 ml. of 5% aqueous sodium hydroxide and then extracted with ether (3×200). The ether was removed in vacuo and the resultant dark oil was vacuum distilled; B.P. 208–210° C./2.0 mm. The resultant oil crystallized upon standing overnight and was recrystallized from isopropyl ether to give 9.5 g. (68%) of product, M.P. 101–102° C.

Analysis.—Calcd. for $C_{15}H_{19}Cl_2N_3O_2$: C, 52.33; H, 5.56; N, 12.26. Found: C, 52.43; H, 5.65; N, 12.11.

*Example 14.—3-[3-(4-methylpiperazin-1-yl)propyl]-2-benzoxazolinone*

In 200 ml. of anhydrous benzene was placed 10.58 g. (0.05 mole) of 3-(3-chloropropyl)-2-benzoxazolinone. The mixture was placed in a nitrogen atmosphere, then stirred and refluxed until a solution was obtained. In one portion 10.0 g. (0.10 mole) of N-methylpiperazine was added and the entire mixture stirred and refluxed for six hours. The solvent was evaporated in vacuo on a steam bath and the resultant oil shaken with 300 ml. of 5% aqueous sodium hydroxide. The solution was extracted with ether (3×200). The ether was removed in vacuo and the resultant solid was placed in anhydrous benzene, hydrogen chloride gas passed through the solution, and the resultant solid was recrystallized from ethanol to give 7.6 gm. (72%) of product, M.P. 230–231° C.

*Example 15.—3-[3-(4-methylpiperazin-1-yl)propyl]-5-chloro-6-bromo-2-benzoxazolinone*

Using the method of Example 13, 3-(3-chloropropyl)-5-chloro-6-bromo-2-benzoxazolinone is mixed and reacted together with N-methylpiperazine to give 3-[3-(4-methylpiperazin-1-yl)propyl] - 5 - chloro-6-bromo-2-benzoxazolinone.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A compound selected from the group consisting of compounds having the formula:

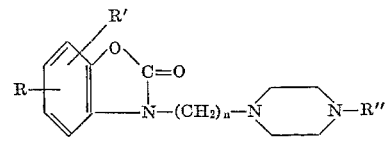

wherein R is selected from the group consisting of halogen, trifluoromethyl, lower-alkyl and lower-alkoxy,
wherein R' is selected from the group consisting of halogen and hydrogen,
wherein R" is selected from the group consisting of lower - alkyl, hydroxy - lower - alkyl, lower-alkoxy-lower-alkyl, phenyl, halophenyl, lower-alkylphenyl, lower-alkoxyphenyl, and trifluoromethylphenyl, and
wherein n is 2 or 3,
and pharmaceutically acceptable acid addition salts thereof.

2. A compound according to claim 1 which is 3-[3-(4-methylpiperazino)propyl] - 2 - benzoxazolinone acid addition salt.

3. A compound according to claim 1 which is 3-[3-(4-methylpiperazino)propyl] - 5 - fluoro-2-benzoxazolinone acid addition salt.

4. A compound according to claim 1 which is 5-chloro-3-[3-(4-methylpiperazino)propyl] - 2 - benzoxazolinone acid addition salt.

5. A compound according to claim 1 which is 3-{3-[4-(2-hydroxyethyl)piperazino]propyl}-2-benzoxazolinone.

6. A compound according to claim 1 which is 3-{3-[4-(2 - hydroxyethyl)piperazino]propyl} - 5 - fluoro-2-benzoxazolinone.

7. A compound according to claim 1 which is 5-chloro-3-{3-[4-(2 - hydroxyethyl)piperazino]propyl} - 2 - benzoxazolinone.

8. A compound according to claim 1 which is 3-[3-(4-phenylpiperazino)propyl]-2-benzoxazolinone.

9. A compound according to claim 1 which is 3-[3-(4-methylpiperazin-1-yl)propyl] - 5,6 - dichloro-2-benzoxazolinone.

10. A compound according to claim 1 which is 3-[3-(4-methylpiperazin-1-yl)propyl] - 5 - chloro-6-bromo-2-benzoxazolinone.

References Cited
UNITED STATES PATENTS 2,857,394  10/1958  De Stevens _____ 260—307
3,239,528  3/1966   Von Bebenburg _____ 260—268

HENRY R. JILES, *Primary Examiner.*